(12) United States Patent
Wu

(10) Patent No.: US 6,789,564 B1
(45) Date of Patent: Sep. 14, 2004

(54) HOSE REEL

(76) Inventor: Chung-Cheng Wu, 1Fl., No. 93, Wenming Rd., Gueishan Shiang, Taoyuan Hsien (TW)

(*) Notice: Subject to any disclaimer, the term of this patent is extended or adjusted under 35 U.S.C. 154(b) by 0 days.

(21) Appl. No.: 10/426,634

(22) Filed: May 1, 2003

(51) Int. Cl.$^7$ ............................. F16L 5/00; B65H 75/34
(52) U.S. Cl. ............. 137/360; 137/355.17; 137/355.26; 137/315.01
(58) Field of Search ..................... 137/355.17, 315.01, 137/355.26, 360

(56) References Cited

U.S. PATENT DOCUMENTS

| | | | |
|---|---|---|---|
| 654,413 A | * 7/1900 | Powers | 137/355.19 |
| 1,441,157 A | * 1/1923 | Otto | 137/355.26 |
| 1,746,995 A | * 12/1930 | Edwards | 137/355.17 |
| 2,805,100 A | * 9/1957 | Shaver | 137/355.26 |
| 2,823,074 A | * 2/1958 | Bernard, Jr. | 137/355.17 |
| 3,384,108 A | * 5/1968 | Kern, Jr. | 137/355.17 |
| 3,820,559 A | * 6/1974 | Griffiths et al. | 137/355.16 |
| 4,092,997 A | * 6/1978 | Hansen | 137/351 |
| 4,543,982 A | * 10/1985 | Wolfe | 137/355.21 |
| 6,588,444 B2 | * 7/2003 | Paplow et al. | 137/15.01 |

* cited by examiner

Primary Examiner—A. Michael Chambers
(74) Attorney, Agent, or Firm—Birch, Stewart, Kolasch & Birch, LLP

(57) ABSTRACT

A hose reel includes a reel and a movable curve tube disposed on the center of a tabular rack. A cover is fixed on a lateral side of the rack while a crank is positioned on the other lateral side. A multi-path hose connects to a movable curve tube by a coupling for being wound on the reel through the crank. Thus the hose is pulled out at the desired length for easy use and ideal storage

3 Claims, 14 Drawing Sheets

US 6,789,564 B1

HOSE REEL

BACKGROUND OF THE INVENTION

1. Field of the Invention

The present invention relates to a hose reel, more particularly, to a hose reel that can pull the hose out at the desired length for easy use and also ideal for storage.

2. Description of the Prior Art

While washing cars, windows, pouring water in short distance or watering garden plants, a flexible hose is attached to the water faucet for conveying water. After users finishing, the hose needs to be rewound and tied by a string for keeping everything neat and out of the way. Next time, users need to ravel the string and leave the hose lying on the ground. It's trouble for users to rewind the hose.

Refer to FIG. 12, a soft hose (b) winds on a tabular rack (a). After winding, the soft hose (b) is pressed into plate shape. Thus when being used, it is necessary to pull out the hose in fill length for connecting water source and making water flow run smoothly. It's inconvenience for users.

Refer to FIG. 13, & FIG. 14, it's another kind of prior art. A reel (d) is positioned on a rack (c). A crank (e) is installed on one lateral side of the reel (d) and a tube (f) is disposed on the other lateral side of the reel (d). One end of a hose (g1) is connected with the inner side of the tube (f) while the outer side of the tube (f) is connected with another hose (g2) linked to a water faucet (not shown in figure). By turning the crank (d), the hose (g1) moves along the reel (d). The hose (g1) is a flexible and renitent tube. When being used, another hose (g2) is connected to the outer side of the tube (f), the hose (g1) is pulled out and then turn on the faucet. There is no need to pull out the hose (g1) in full-length. However, the volume of the crank (d) and the rack (c) is too large thus causes inconvenience for storage and transportation.

SUMMARY OF THE INVENTION

It is therefore a primary object of the present invention to provide a hose reel that can pull out the hose quickly and easily according to users' need, ideal for safekeeping or storage.

BRIEF DESCRIPTION OF THE DRAWINGS

The accomplishment of the above-mentioned object of the present invention will become apparent from the following description and its accompanying drawings which disclose illustrative an embodiment of the present invention, and arc as follows.

DETAILED DESCRIPTION OF THE PREFERRED EMBODIMENT

Figure 1:
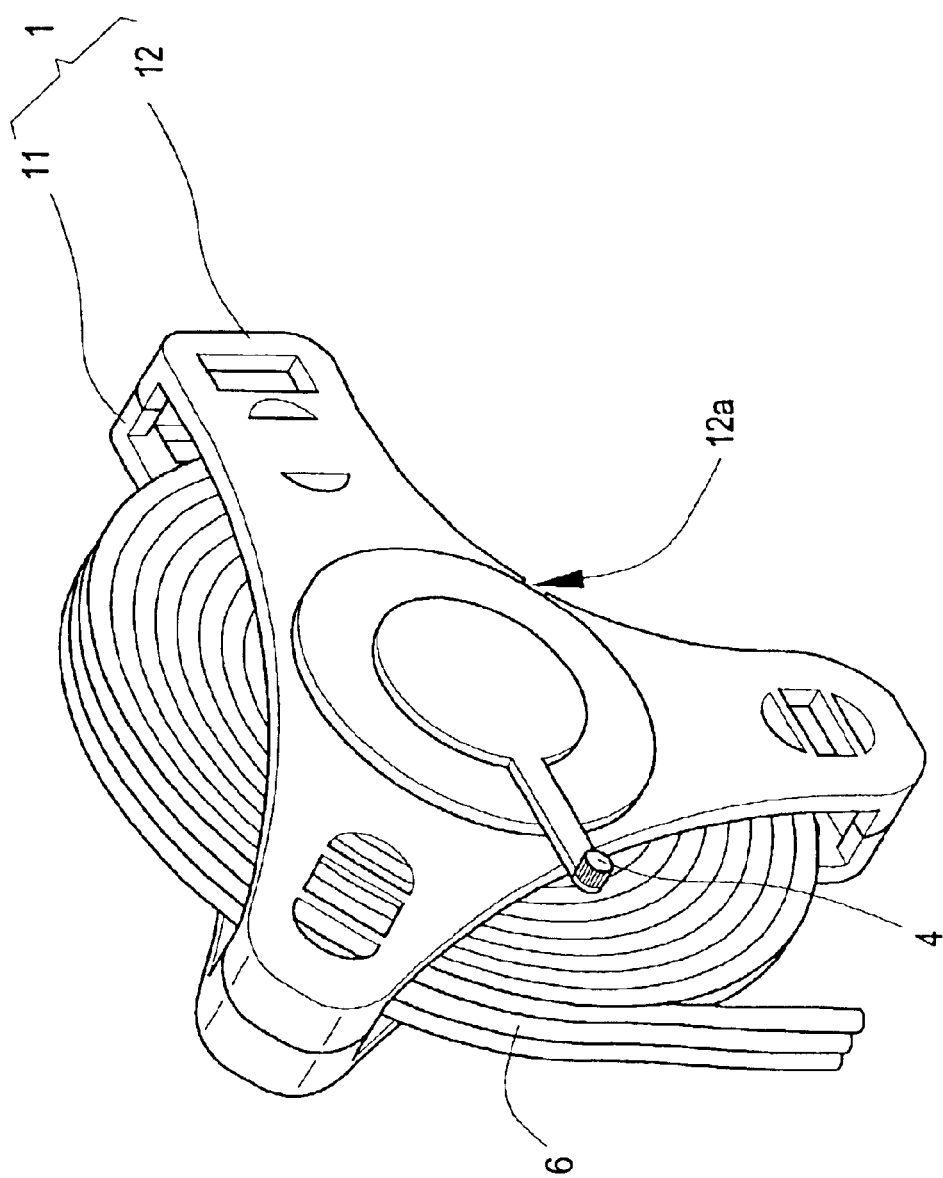
FIG. 1 is a perspective view of the present invention.

Refer from FIG. 1 to FIG. 5, the present invention includes the following parts:

a tabular rack 1 having a top rack 11 and a bottom rack 12;

a cover 2 fixed on a lateral side of the top rack 11 and connected with a water inlet tube 21 linked to a faucet (not shown in figure);

a reel 3 pivoted on the center position of the top rack 11 and the bottom rack 12 with a plurality of projecting parts 32 on upper and lower ends for making the reel 3 rotating inside the tabular rack 1, a nick 31 is on the circumference of the reel 3;

a crank 4 disposed on the lateral side of the tabular rack 1 and connected with the reel 3 so as to rotate the reel 3;

a movable curve tube 5 having a water inlet tube 51 and a water outlet tube 52, positioned and fixed on the center of the reel 3, rotating together with the reel 3; the water outlet tube 52 has threads 52a on surface thereof; a leakproof ring 53 is disposed on the top of the water inlet tube 51 and then inserts into the water inlet tube 21 of the cover 2 so as to connect the water inlet tube 51 of the movable curve tube 5 with the water inlet tube 21 of the cover 2;

a multi-path hose 6 connected to the water outlet tube 52 of the movable curve tube 5 by a coupling 61 that has a connecting pipe 61a, a screw nut 61b and a pair of corresponding clips 61c. The connecting pipe 61a inserts through the screw nut 61b and then connects to one end of the multi-path hose 6. Next the two clips 61c clip on the connecting pipe 61a so that the coupling 61 is assembled with one end of the multi-path hose 6. The screw nut 61b of the coupling 61 screws into the threads 52a on the water outlet tube 52 of the movable curve tube 5.

In accordance with the structure mentioned above, one end of the multi-path hose 6 connects with the coupling 61 having the screw nut 61b screwing onto the water outlet tube 52 of the movable curve tube 5 so that the screw nut 61b moves freely. By the screw nut 61b, the multi-path hose 6 is joined with the threads 52a of the movable curve tube 5. Therefore, the multi-path hose 6 moves along the reel 3 by manual winding the crank 4 on lateral side of the reel 3.

In addition, the movable curve tube 5 is fixed on the center position of the reel 3 and the water inlet tube 51 of the movable curve tube 5 connects with the water inlet tube 21 of the cover 2. Thus the movable curve tube 5 rotates inside the water inlet tube 21.

Moreover, the water outlet tube 52 of the movable curve tube 5 connects to the multi-path hose 6 by the coupling 61 while the multi-path hose is a knitted soft tube with anti-pressing caliber. Such design prevent the soft hose (b) from being tangled or bunched during the winding process.

Furthermore, the tabular rack 1 is a flat covering with small volume, ideal for storage and safekeeping.

Figure 2:
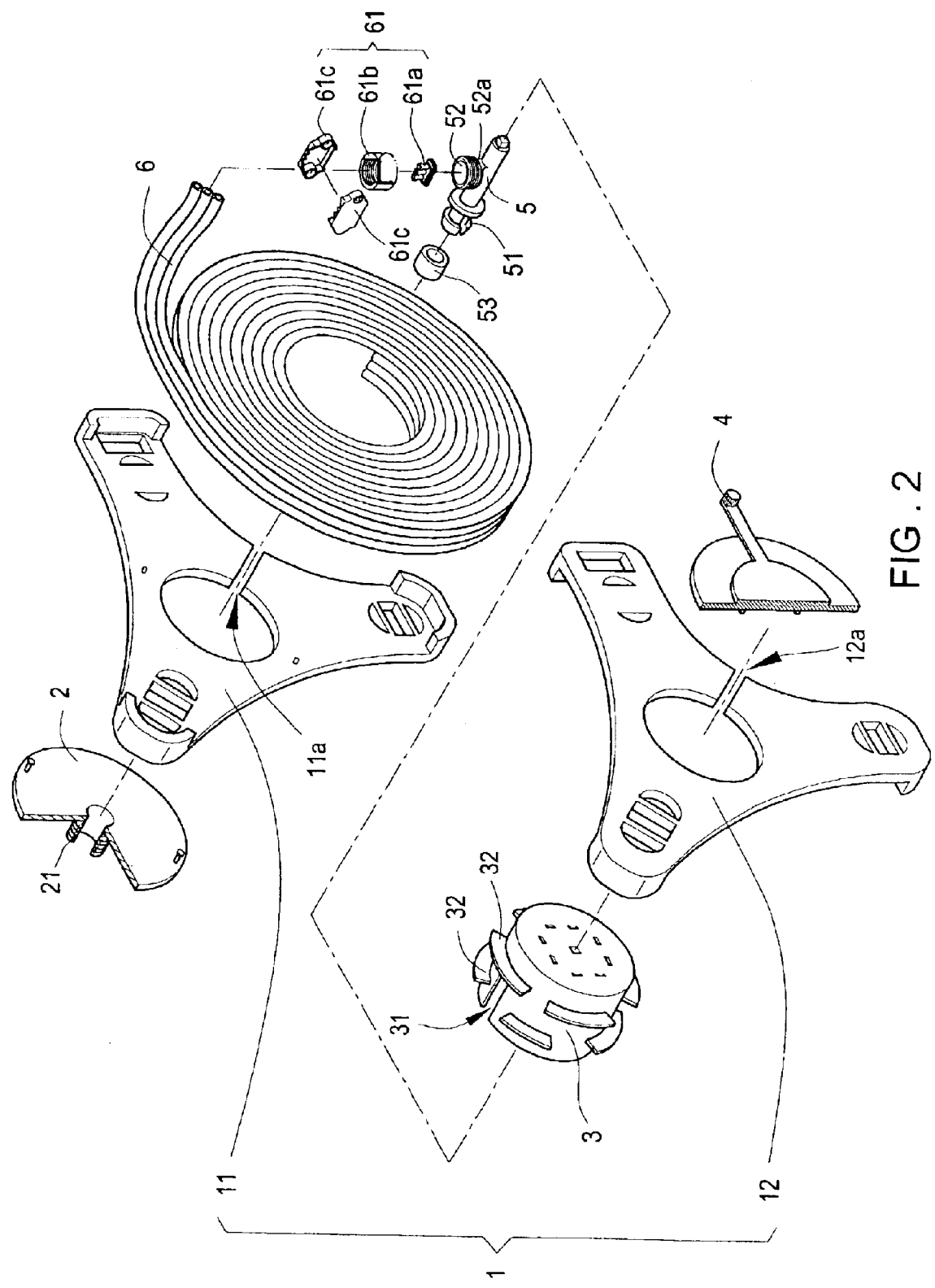
FIG. 2 is an explosive view of the present invention.
Figure 3:
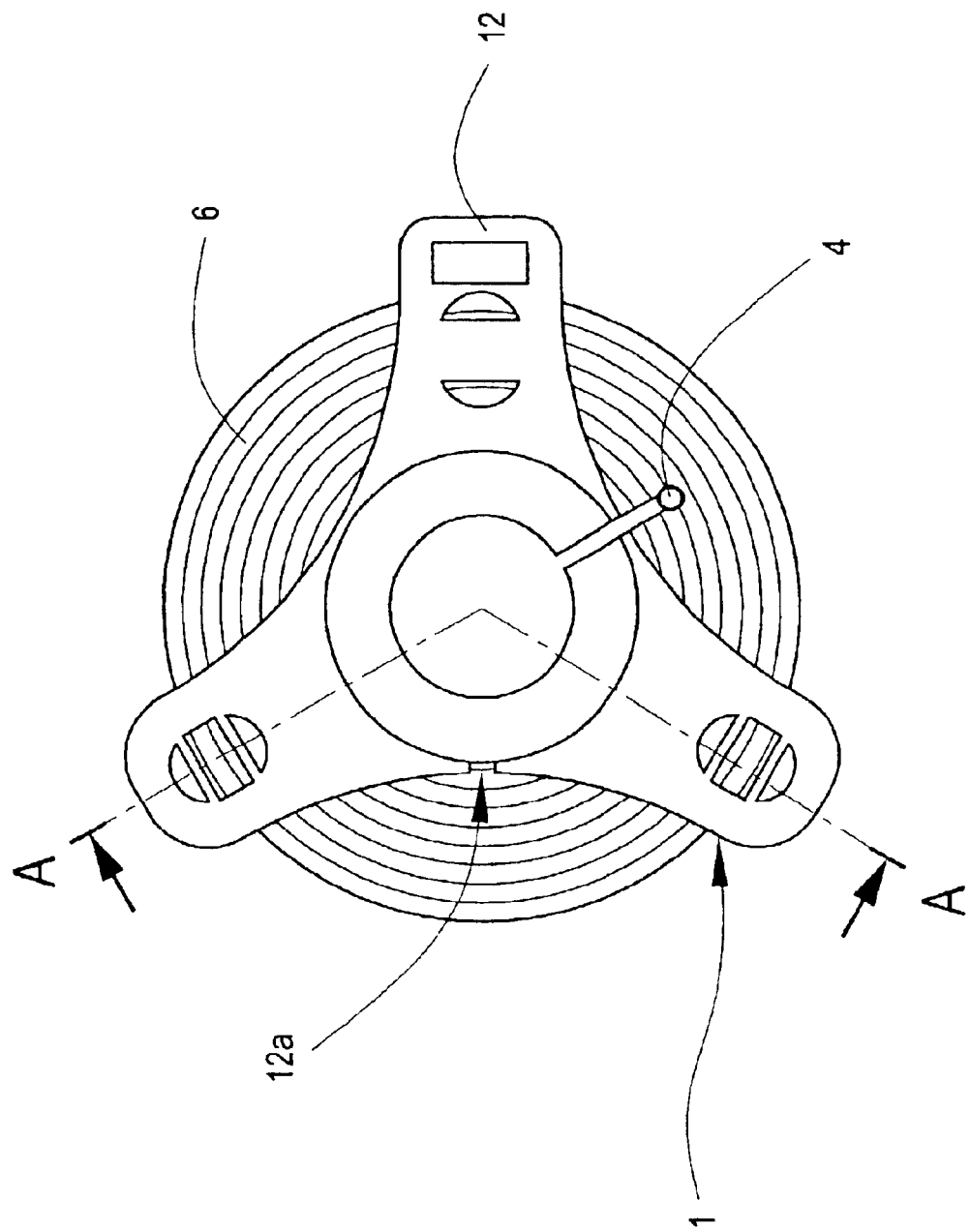
FIG. 3 is a front view of the present invention.
Figure 4:
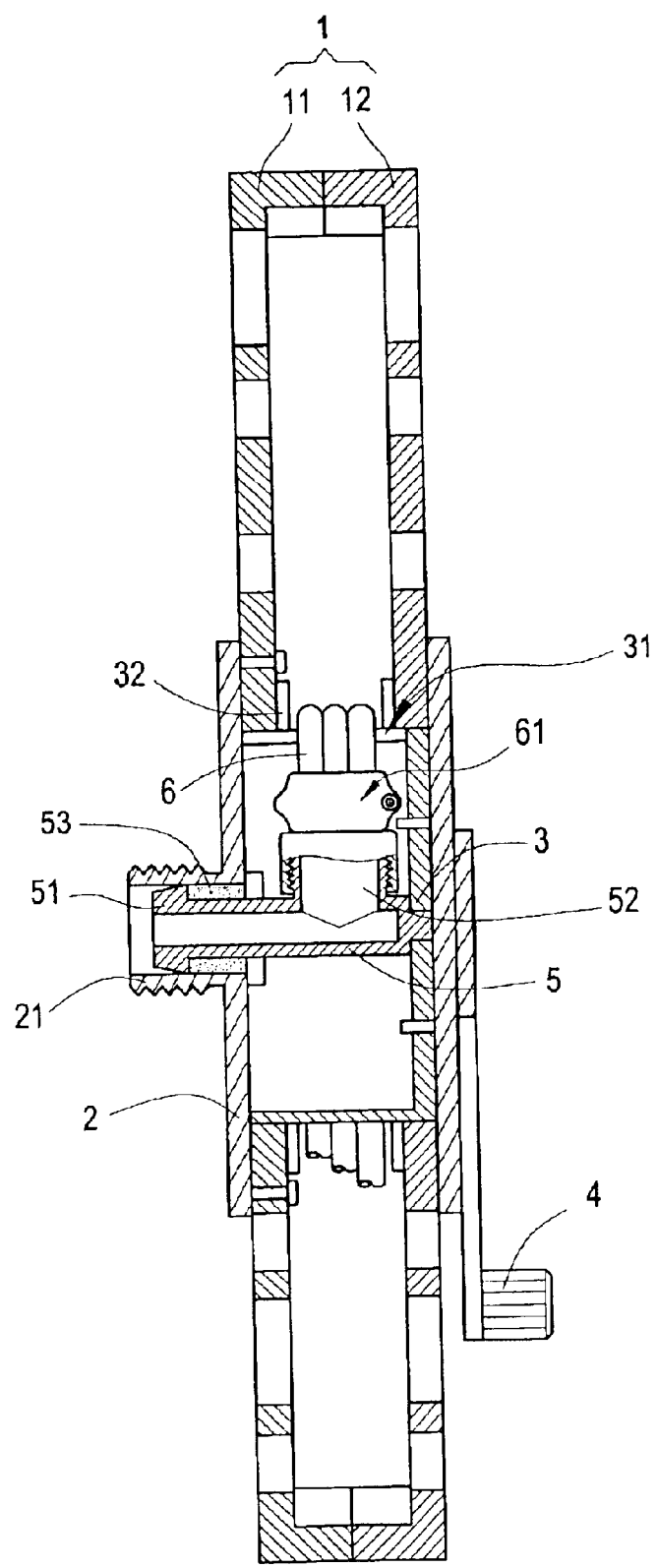
FIG. 4 is a cross sectional view along the line A—A in FIG. 3.
Figure 5:
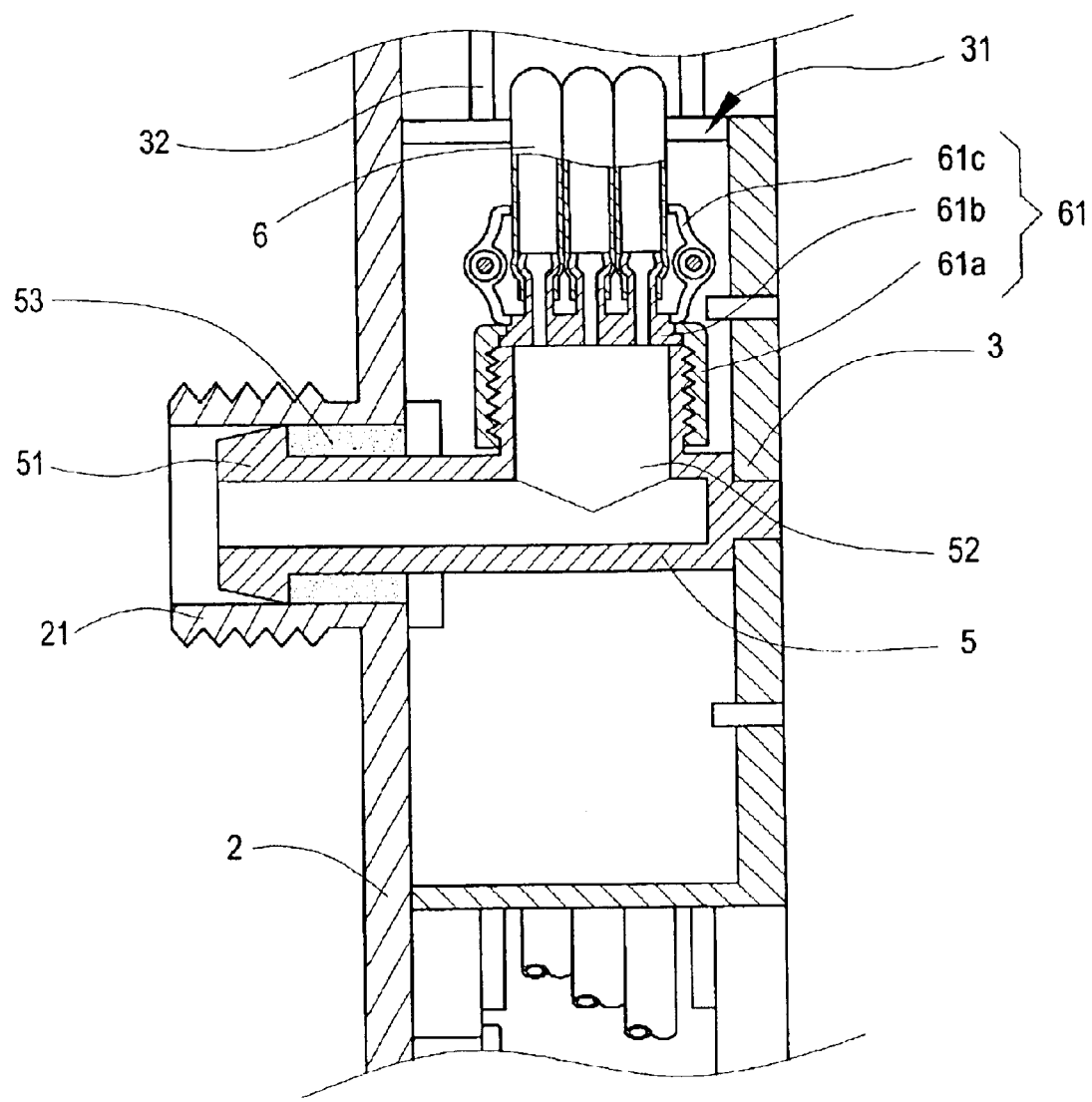
FIG. 5 is a partial cross sectional view of the FIG. 4.

Refer to FIG. 1 & FIG. 2, the top rack 11 and the bottom rack 12 having a slot 11a, 12a respectively. After the multi-path hose 6 being pulled out all, the cover 2 is removed, and the coupling 61 is detached from the movable curve tube 5. Then take out the multi-path hose 6 from the slot 11a or 12a for independent use. This is an embodiment of the present invention.

Figure 6:
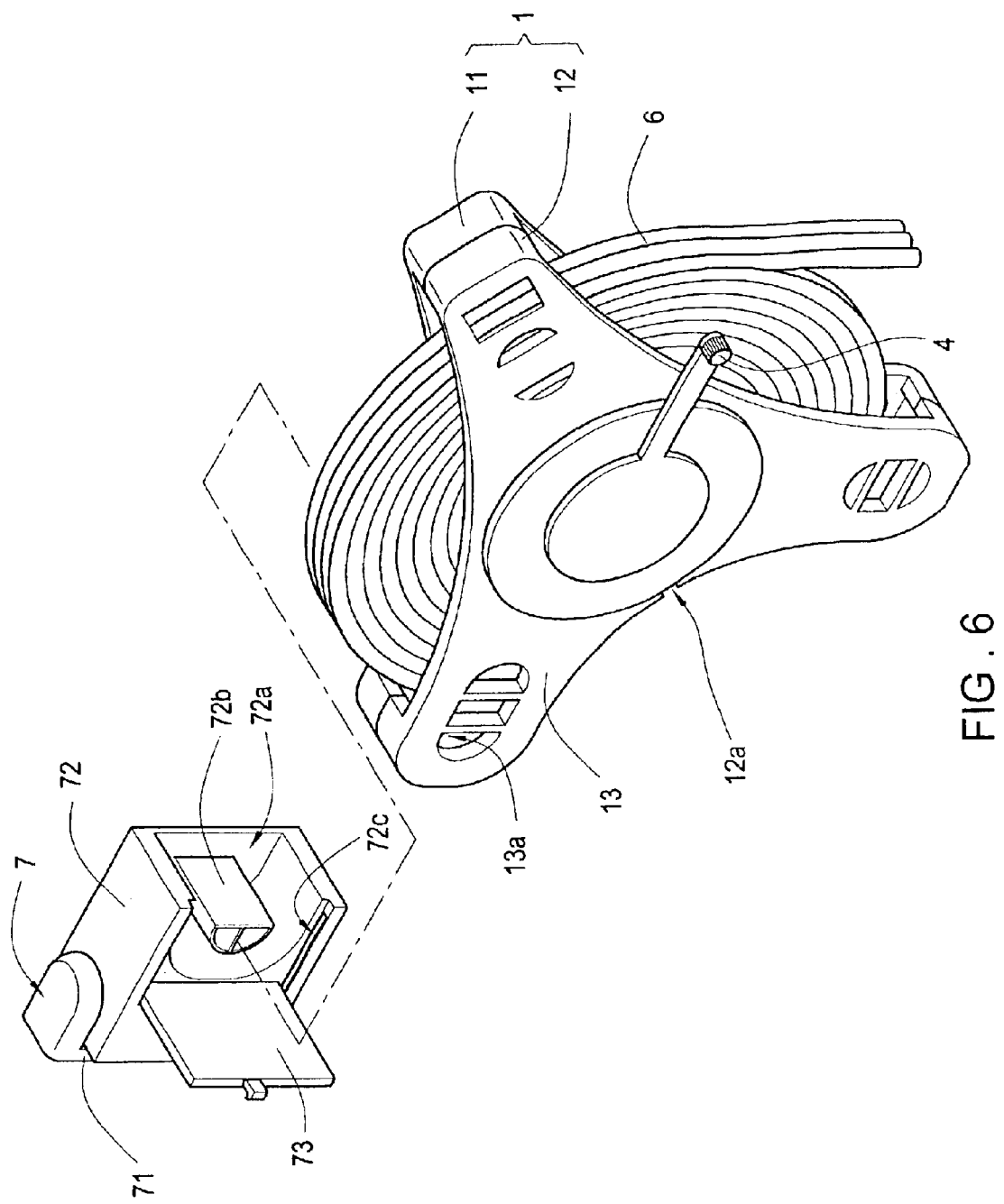
FIG. 6 is a perspective view of the rack and the wall mount bracket of an embodiment in accordance with the present invention.
Figure 7:
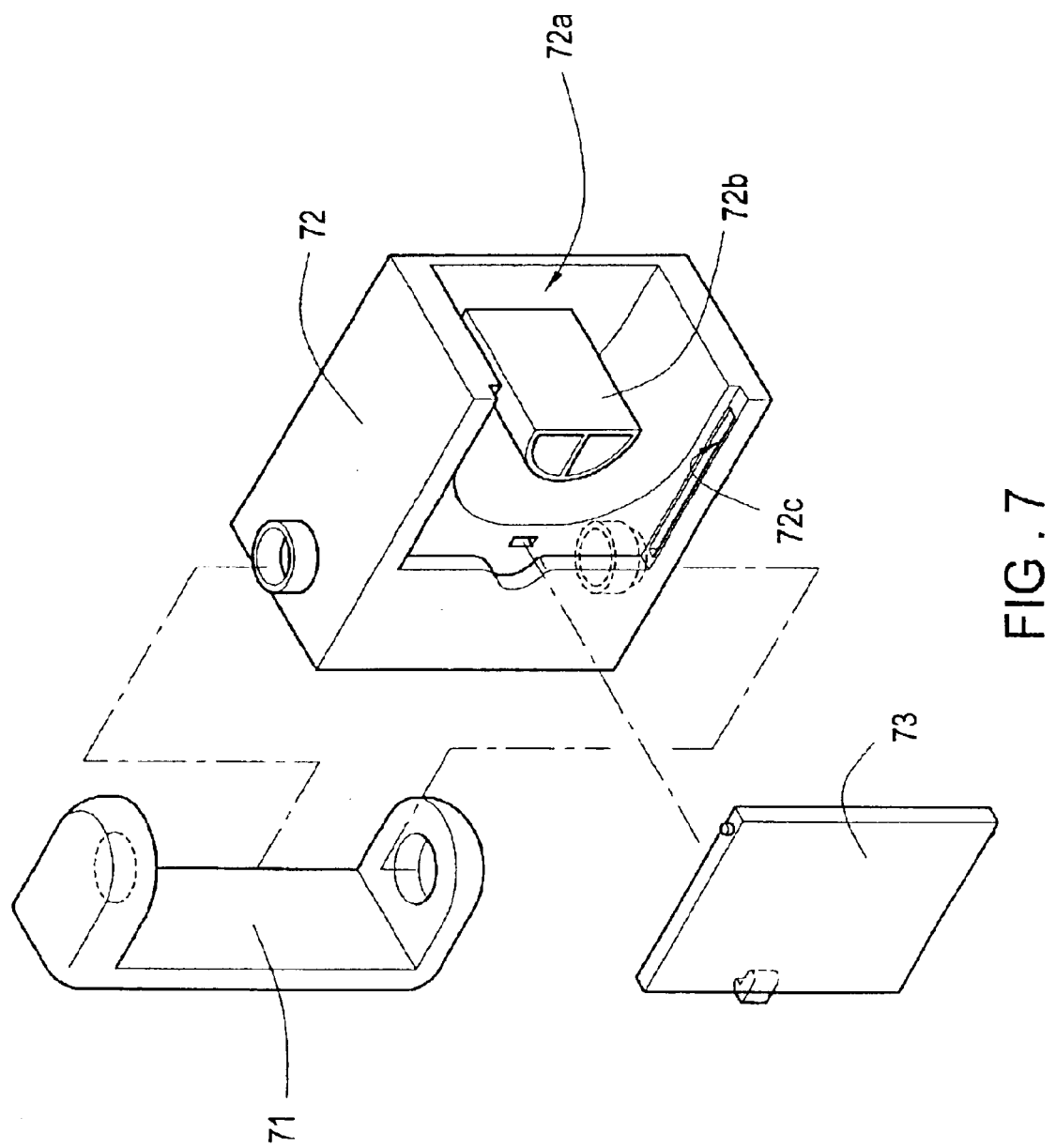
FIG. 7 is an assembling view of the wall mount bracket of the present invention.

Refer to FIG. 6, the rack has a plurality of radiating plates 13, wherein one of the radiating plates 13 is disposed with a interlocking hole 13a. The rack 1 connects to a wall (mount) bracket 7. As shown in FIG. 7, the wall mount bracket 7 having a U-shaped bracket 71 pivoted with a block 72 that has an opening 72a with the same shape of the end of the radiating plates 13 and a post 72b corresponding to the interlocking hole 13a positioned inside the opening 72a. Two sliding slots 72c are positioned on two lateral sides of the opening 72a and a covering plate 73 is disposed between the two sliding slots 72c.

Figure 8:
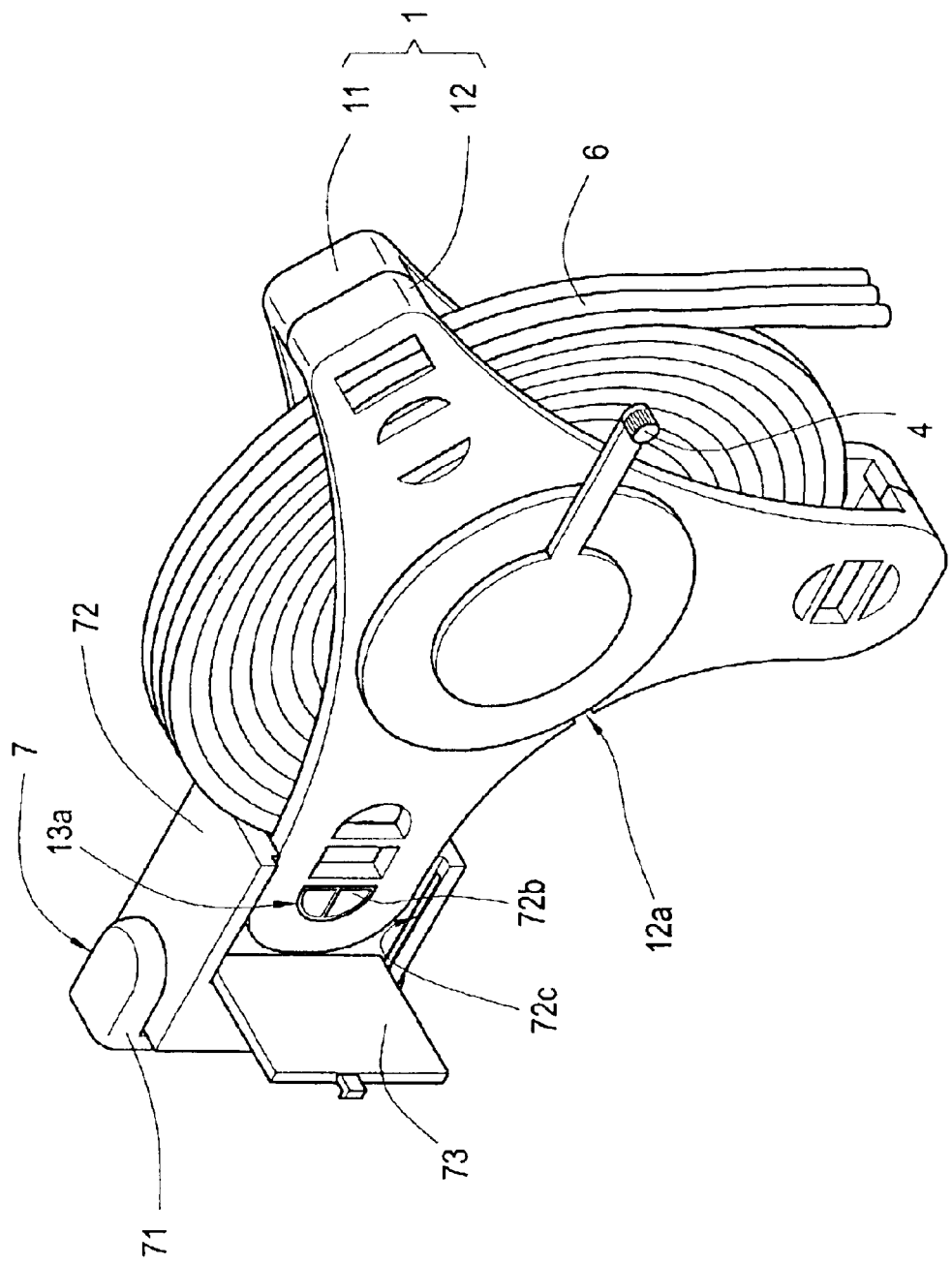
FIG. 8 is a schematic drawing while the rack is assembled with the wall mount bracket.
Figure 9:
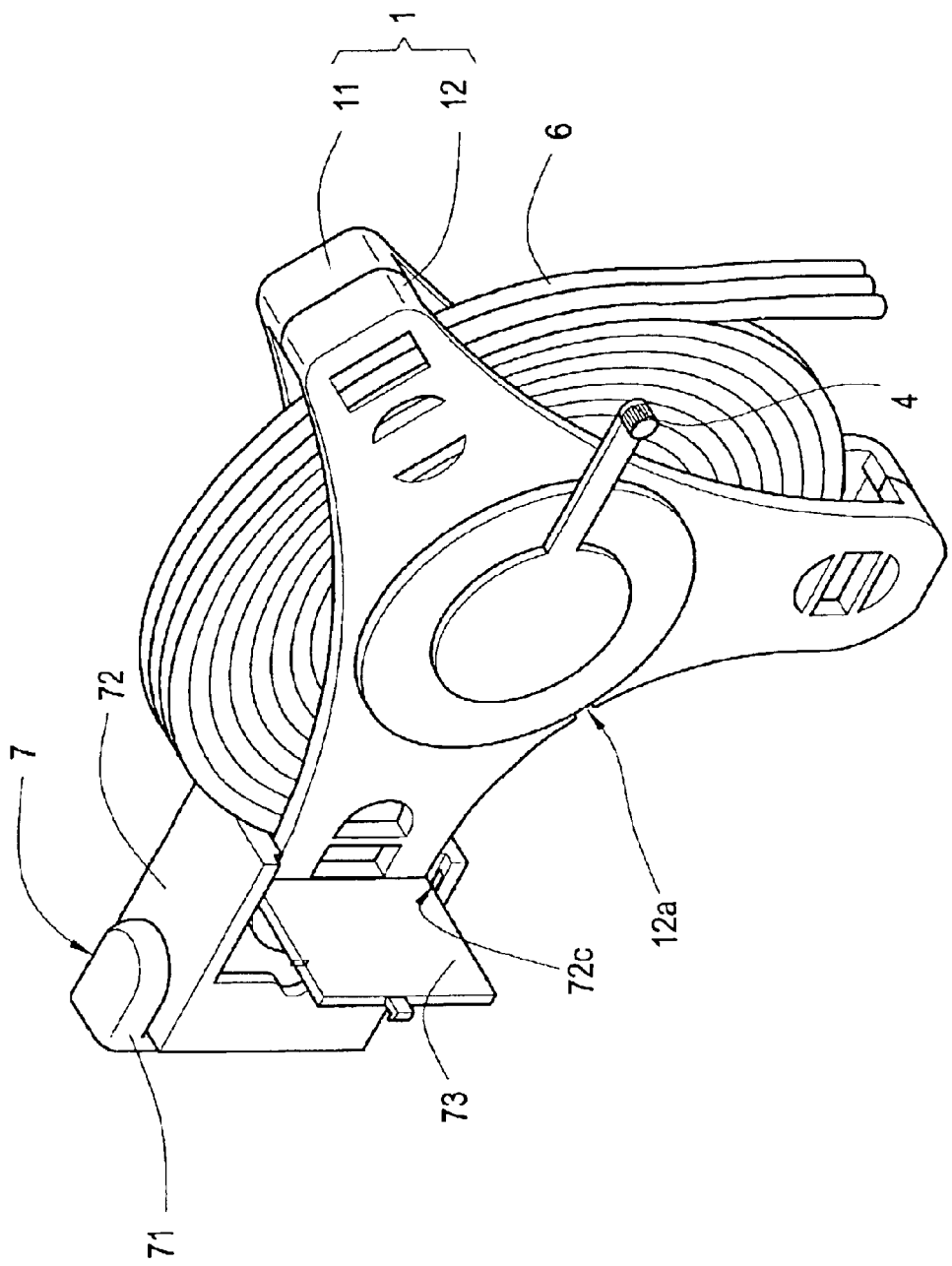
FIG. 9 is a schematic drawing while the rack is assembled with the wall mount bracket.
Figure 10:
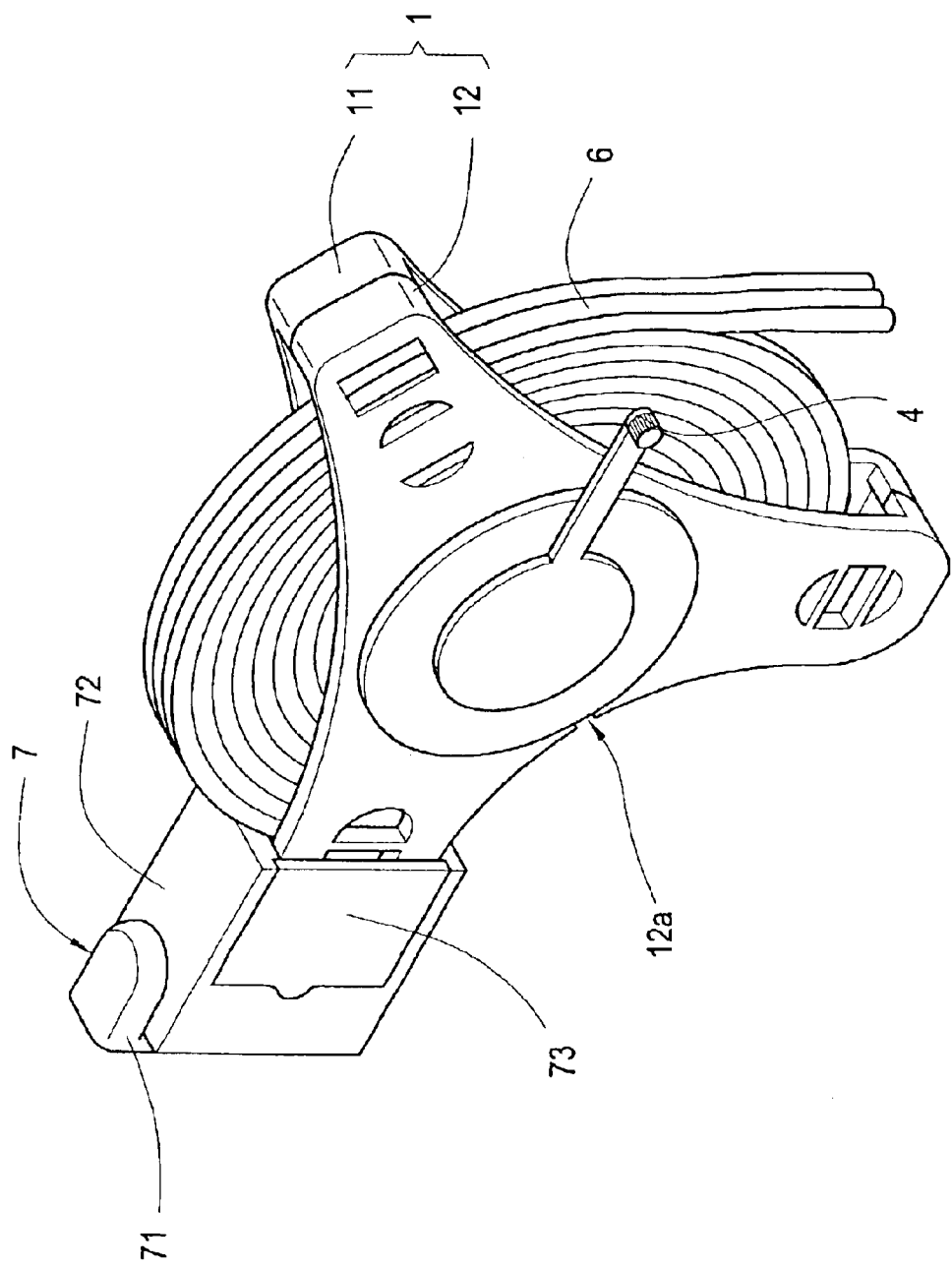
FIG. 10 is a schematic drawing while the rack is assembled with the wall mount bracket.
Figure 11:
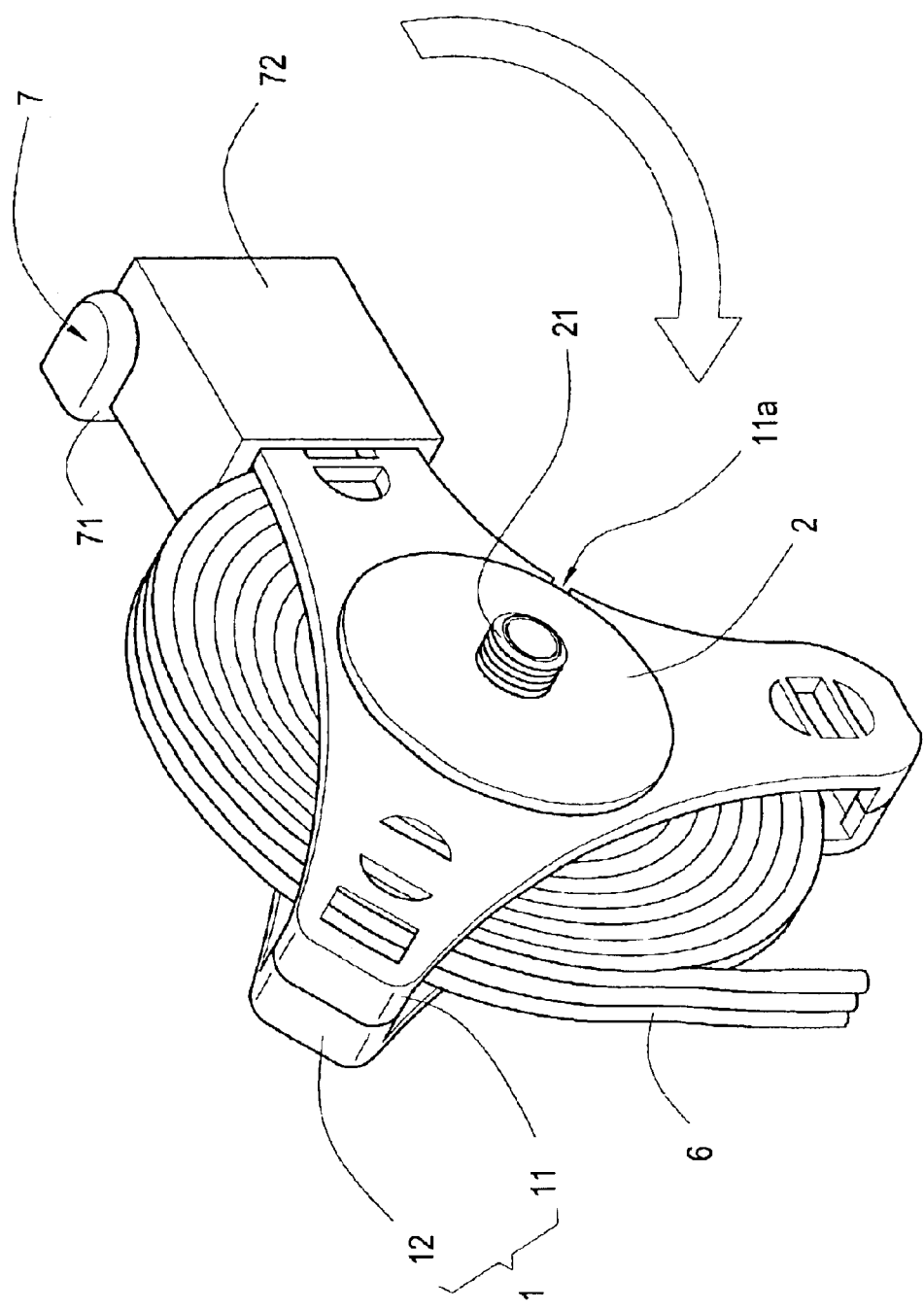
FIG. 11 is a schematic drawing of the present invention while the rack moves toward the wall.
Figure 12:
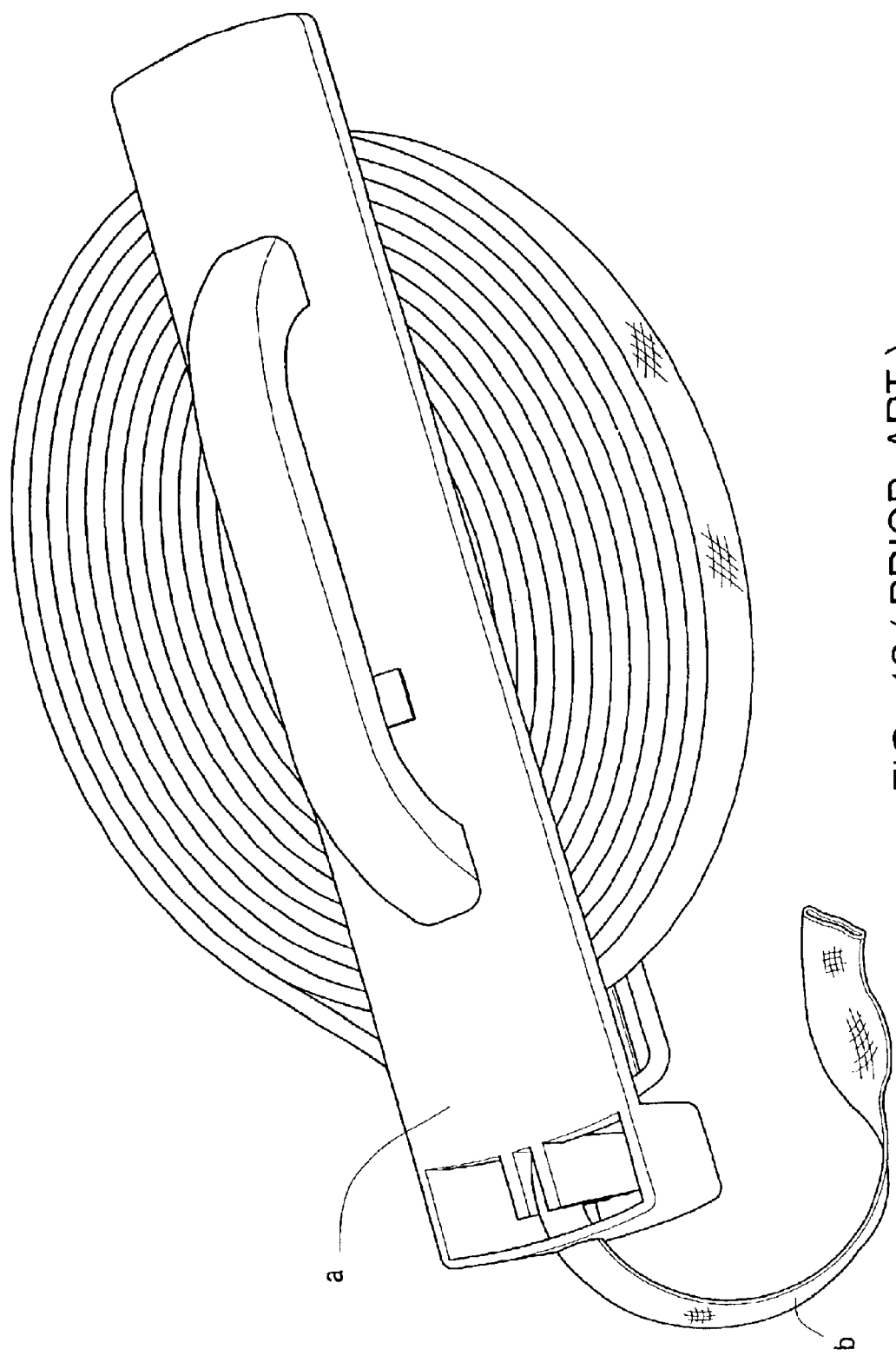
FIG. 12 is a perspective view of a prior art.
Figure 13:
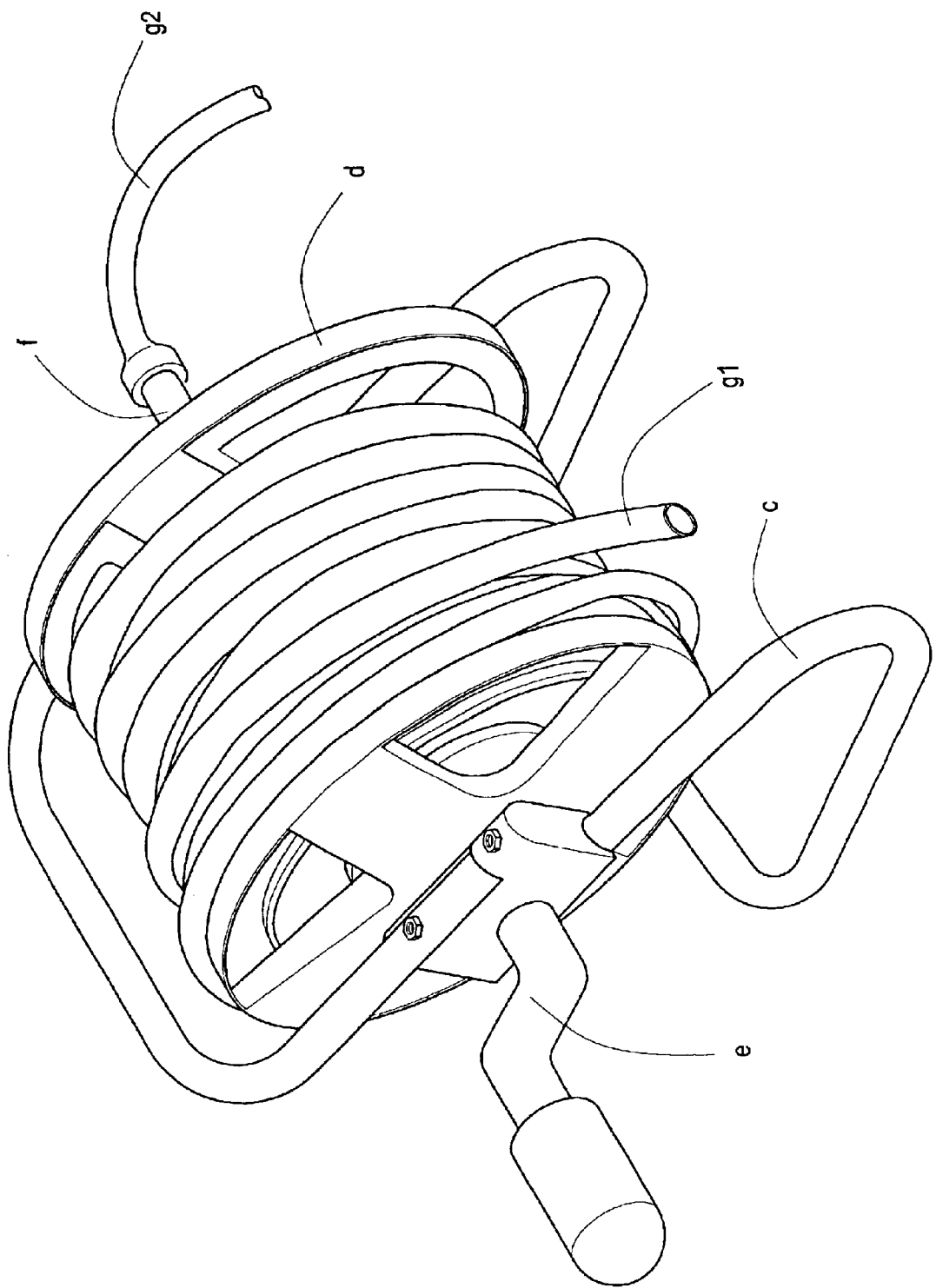
FIG. 13 is a perspective view of another prior art.
Figure 14:
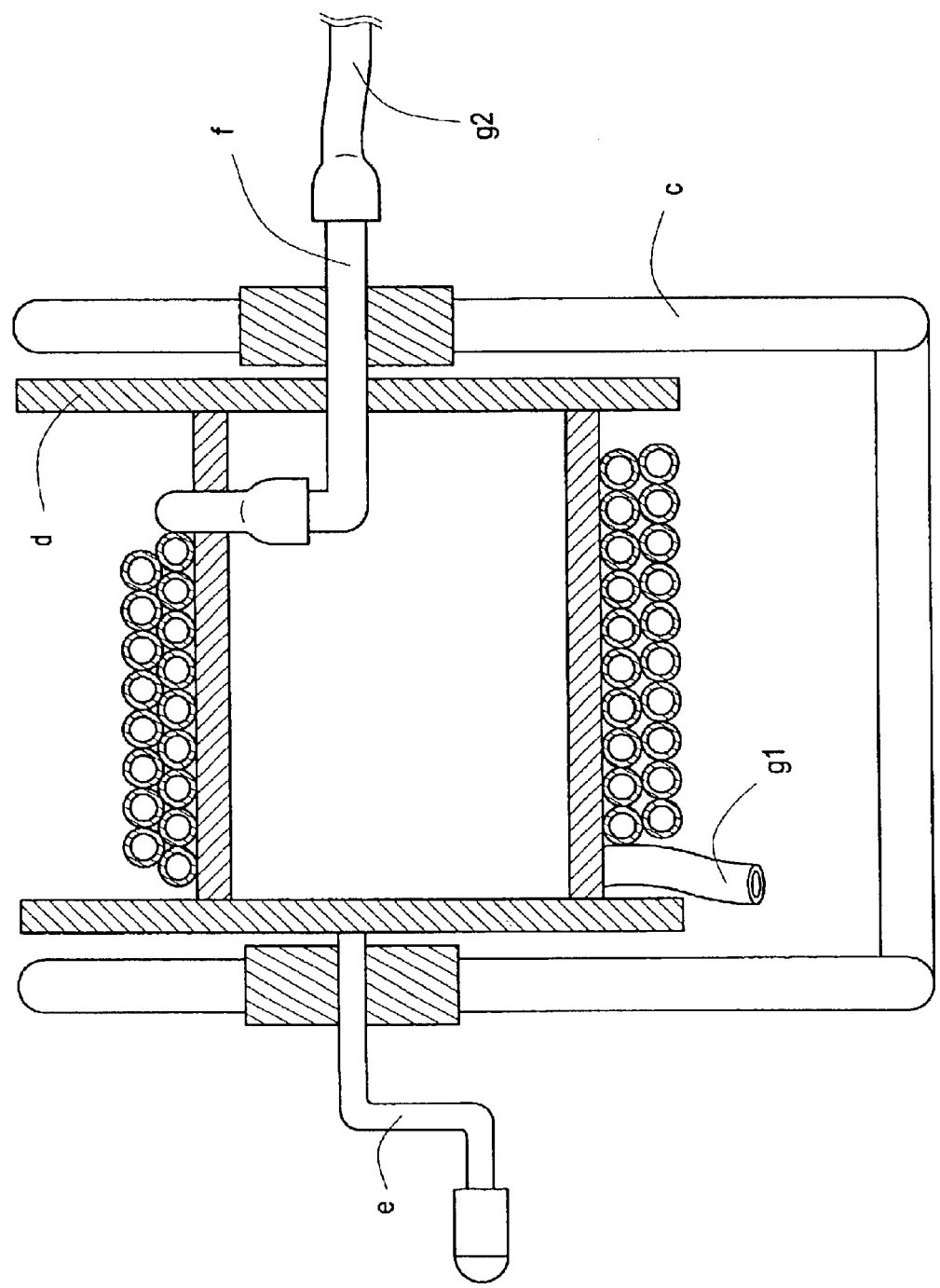
FIG. 14 is a cross sectional view of the FIG. 13.

Refer to FIG. 8, the covering plate 73 is pulled to the left side, then put one end of the radiating plates 13 into the opening 72a, insert the post 72b into the interlocking hole 13a. Next pull the covering plate 73 to the right side, as shown in FIG. 9, then covering plate 73 covers on the opening 72a. Refer to the FIG. 10, the rack 1 is assembled with the wall mount bracket 7. By turning the block 72 pivoted on the U-shaped bracket 71, the rack 1 moves closed to the wall for compact storage, as shown in FIG. 13. This is a further embodiment of the present invention.

It should be noted that the above description and accompanying drawings are only used to illustrate some embodiments of the present invention, not intended to limit the scope thereof. Any modification of the embodiments should fall within the scope of the present invention.

What is claimed is:

1. A hose reel comprising a tabular rack having a top rack and a bottom rack;

a cover fixed on a lateral side of the top rack and connected with a water inlet tube for connecting to a faucet;

a reel pivoted on the center position of the top rack and the bottom rack with a plurality of projecting parts on upper and lower ends for making the reel rotating inside the tabular rack; a nick is on the circumference of the reel;

a crank disposed on the other lateral side of the tabular rack corresponding to the cover, and connected with the reel so as to rotate the reel;

a movable curve tube having a water inlet tube and a water outlet tube, positioned and fixed on the center of the reel, rotating together with the reel; the water outlet tube having threads on surface thereof; a leakproof ring disposed on the top of the water inlet tube and then inserting into the water inlet tube of the cover so as to connect the water inlet tube of the movable curve tube with the water inlet tube of the cover;

a multi-path hose connected to the water outlet tube of the movable curve tube by a coupling that has a connecting pipe, a screw nut and a pair of corresponding clips; the connecting pipe inserting through the screw nut and then connecting to one end of the multi-path hose while the two clips clipping on the connecting pipe so that the coupling is assembled with one end of the multi-path hose and connected to the movable curve tube by the screw nut joined on the coupling with the threads on the water outlet tube of the movable curve tube.

2. The hose reel as claimed in claim 1, wherein a slot is positioned on the top and bottom rack for taking out the multi-path hose therefrom after pulling out the multi-path hose, removing the cover, and detaching the coupling from the movable curve tube.

3. The hose reel as claimed in claim 1, wherein the rack has a plurality of radiating plates and one of the radiating plates is disposed with an interlocking hole; the rack connects to a wall mount bracket; the wall mount bracket having a U-shaped bracket pivoted with a block that has an opening with the same shape of the end of the radiating plates and a post corresponding to the interlocking hole positioned inside the opening; two sliding slots are positioned on two lateral sides of the opening and a covering plate is disposed between the two sliding slots; one end of the radiating plates with the interlocking hole is put into the opening, the post is inserted into the interlocking hole, and the covering plate covers on the opening.

* * * * *